US007861167B2

(12) United States Patent
Fernando et al.

(10) Patent No.: US 7,861,167 B2
(45) Date of Patent: Dec. 28, 2010

(54) DYNAMICALLY EXTENSIBLE APPLICATION PROGRAM FRAMEWORK INCLUDING MESSAGE AND NOTIFICATION ROUTING

(75) Inventors: Joseph P. Fernando, Woodinville, WA (US); Mehul Y. Shah, Bellevue, WA (US); Antonio W. Fernando, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 669 days.

(21) Appl. No.: 11/343,719

(22) Filed: Jan. 31, 2006

(65) Prior Publication Data
US 2006/0129979 A1    Jun. 15, 2006

Related U.S. Application Data

(62) Division of application No. 10/219,222, filed on Aug. 15, 2002.

(51) Int. Cl.
*G06F 3/00* (2006.01)
(52) U.S. Cl. .................. 715/700; 715/714; 715/717
(58) Field of Classification Search ............ 715/700, 715/714, 717
See application file for complete search history.

(56) References Cited

U.S. PATENT DOCUMENTS

| | | | |
|---|---|---|---|
| 5,072,412 A | 12/1991 | Henderson, Jr. et al. | |
| 5,517,645 A | 5/1996 | Stutz et al. | |
| 5,596,702 A | 1/1997 | Stucka et al. | |
| 5,826,027 A | 10/1998 | Pedersen et al. | |
| 5,880,733 A * | 3/1999 | Horvitz et al. | 715/850 |
| 5,937,189 A | 8/1999 | Branson et al. | |
| 5,987,247 A | 11/1999 | Lau | |
| 6,023,275 A * | 2/2000 | Horvitz et al. | 715/700 |
| 6,038,395 A | 3/2000 | Chow et al. | |
| 6,038,565 A | 3/2000 | Nock | |
| 6,101,510 A * | 8/2000 | Stone et al. | 715/234 |
| 6,106,569 A | 8/2000 | Bohrer et al. | |
| 6,167,404 A * | 12/2000 | Morcos et al. | 1/1 |
| 6,169,993 B1 | 1/2001 | Shutt et al. | |
| 6,182,160 B1 | 1/2001 | Burgess | |
| 6,263,486 B1 | 7/2001 | Boezeman et al. | |
| 6,275,979 B1 | 8/2001 | Graser et al. | |
| 6,289,500 B1 | 9/2001 | Baxter et al. | |
| 6,317,794 B1 | 11/2001 | Papierniak et al. | |
| 6,343,313 B1 | 1/2002 | Salesky et al. | |

(Continued)

OTHER PUBLICATIONS

Microsoft Windows XP. Copyright Date: 2001.*

(Continued)

*Primary Examiner*—Doug Hutton
*Assistant Examiner*—Soumya Dasgupta
(74) *Attorney, Agent, or Firm*—Senniger Powers LLP

(57) ABSTRACT

Dynamically configuring an application program at run-time via one or more extension objects. The invention software implements a framework with one or more extension objects providing functionality to an application program and an application manager for integrating the functionality with the application program during execution of the application program. The framework of the invention also formulates and routes application messages between extensible objects of one application program and extensible objects of other application programs implementing a similar, dynamically extensible application program framework. On receipt of messages or notifications, the framework of the receiving application program facilitates the discovery of the intended recipient extension object and routes the message accordingly.

16 Claims, 10 Drawing Sheets

U.S. PATENT DOCUMENTS

| | | | |
|---|---|---|---|
| 6,353,850 B1 * | 3/2002 | Wies et al. | 709/203 |
| 6,381,654 B1 | 4/2002 | Brawn et al. | |
| 6,385,769 B1 | 5/2002 | Lewallen | |
| 6,405,363 B1 | 6/2002 | Carlson et al. | |
| 6,535,230 B1 * | 3/2003 | Celik | 715/769 |
| 6,605,122 B1 * | 8/2003 | Hearn et al. | 715/236 |
| 6,828,989 B2 * | 12/2004 | Cortright | 715/769 |
| 6,918,084 B1 | 7/2005 | Slaughter et al. | |
| 7,574,665 B2 * | 8/2009 | Cortright | 715/768 |
| 7,636,766 B2 * | 12/2009 | Abramowitz | 709/217 |
| 2001/0029527 A1 | 10/2001 | Goshen | |
| 2002/0035605 A1 | 3/2002 | McDowell et al. | |
| 2002/0054054 A1 * | 5/2002 | Sanbe | 345/700 |
| 2002/0169851 A1 * | 11/2002 | Weathersby et al. | 709/218 |
| 2003/0028637 A1 | 2/2003 | Gross | |
| 2003/0184584 A1 * | 10/2003 | Vachuska et al. | 345/762 |
| 2004/0085367 A1 * | 5/2004 | Hagarty, Jr. | 345/854 |
| 2005/0210379 A1 * | 9/2005 | Weathersby et al. | 715/513 |

OTHER PUBLICATIONS

Red Hat Linux Getting Started Guide. Copyright: 2003.*

Red Hat Linux Version 7. "Red Hat Linux Version 7 Unleashed" by Bill Blass; Copyright Oct. 30, 2000.*

Schmidt et al."The Configurator Framework: An Extensible Architecture for Dynamically Concurrent, Multi-Service Network Daemons." Copyright: Mar. 1994.*

Unknown, Definition of "message," The Authoritative Dictionary of IEEE Standards Terms, 2000, IEEE Press, 7th ed., p. 687. U.S.A.

Christodoulou et al., "Evaluation of Hypermedia Application Development and Management Systems," Proceedings of the Ninth ACM Conference on Hypertext and Hypermedia: Links, Objects, Time and Space—Structure in Hypermedia Systems: 1998, pp. 1-10, ACM Press, New York, U.S.A.

Wetherall et al., "ANTS: A Toolkit for Building and Dynamically Deploying Network Protocols," Apr. 1998, IEEE OPENARCH'98.

Wetherall, "Service Introduction in an Active Network," Feb. 1999, Massachusetts Institute of Technology.

Wetherall, "Active network vision and reality: lessons from a capsule-based system," Dec. 1999, Operating Systems Review 34(5), pp. 64-79.

"Dynamic Markup Language Whitepaper," Jul. 2001, Rocklyte Systems.

K.A. Bohrer, "Architecture of the San Francisco frameworks," 1998, IBM.

"T.120 Whitepaper", 1995 DataBeam Corporation, downloaded from http://www.dtic.mil/ieb_cctwg/contrib-docs/T.120/T.120-WP.html on Dec. 27, 2007, 15 pgs.

"Application and Whiteboard Sharing Using Windows Messenger v4.0", Oct. 9, 2001, Microsoft, downloaded from http://www.microsoft.com/windowsxp/using/windowsmessenger/learnmore/appswbsharing.mspx?pf=true on Dec. 27, 2007, 5 pgs.

"DataBeam's shared Whiteboard Toolkit . . . ", 1996, Business Wire, downloaded from http://findarticles.com/p/articles/mi_m0EIN/is_1996_August_26/ai_18615192/print on Dec. 27, 2007, 2 pgs.

Shi, Hong, "Whiteboard with Java multicast and simplified RTP", published at http://www.cs.columbia.edu/-hgs/teaching/ais/1998/projects/Hong_Shi/report.html and archived by the 'WaybackMachine' (http://www.archive.org/web/web/php) on Jan. 11, 2001, 5 pgs.

D. C. Schmidt and T. Suda, "The Service Configurator Framework: An Extensible Architecture for Dynamically Configuring Concurrent, Multi-Service Network Daemons". In Proceedings of the Second International Conference on Configurable Distributed Systems, Mar. 21-23, 1994, Pittsburgh Pennsylvania, USA. IEEE Computer Society. http://citeseer.ist.psu.edu, 13 pgs.

* cited by examiner

DYNAMICALLY EXTENSIBLE APPLICATION PROGRAM FRAMEWORK INCLUDING MESSAGE AND NOTIFICATION ROUTING

CROSS-REFERENCE TO RELATED APPLICATION

This application is a divisional of U.S. patent application Ser. No. 10/219,222, filed Aug. 15, 2002, the entire disclosure of which is incorporated herein by reference.

TECHNICAL FIELD

The present invention relates to the field of application program design. In particular, this invention relates to an extensible application program framework in which extension object providers supply extension objects to add functionality to or change existing functionality of an application program.

BACKGROUND OF THE INVENTION

Object-oriented programming methodologies are rapidly replacing the procedure-oriented monolithic application development that was prevalent a decade ago. In current application program development frameworks, the exposed functionality is static in nature in that a fixed and inherent set of exposed properties and methods are employed by the application components. Existing extension mechanisms require that extensions be provided via fixed properties, methods, and general framework updates at compile or design time. Such current systems fail to provide a dynamically upgradeable or otherwise extensible application program framework encompassing both user interface and application logic (i.e., core infrastructure) components.

For these reasons, a dynamically extensible application program framework having messaging and notification routing is desired to address one or more of these and other disadvantages.

SUMMARY OF THE INVENTION

The invention includes software implementing a framework for a dynamically extensible application program. In particular, the invention software includes one or more extension objects providing functionality to the application program and an application manager for integrating the functionality with the application program during execution of the application program.

Rather than a static configuration of functionality for an application program, the extensible application program framework of the invention provides for dynamic reconfiguration of application program functionality, on the fly, without a re-compilation of the application program. The extensible application program framework of the invention enables dynamically extending the inherent functionality that is available for a component resident within the application program through extension objects. An extension object is proffered by an extension object provider when the extension object is first referenced (e.g., the functionality is first requested). The extension object provider creates an appropriate extension object that implements the requested functionality. The extension object services all references to the extension or other requests for the functionality. Information about the extension object provider is registered in a database of the application manager when the extension object provider is installed. The database is used to resolve references to the extended methods and/or properties upon execution of the application program.

The framework of the invention also formulates and routes application messages between extensible objects of one application program and extensible objects of other application programs implementing a similar, dynamically extensible application program framework. On receipt of messages or notifications, the framework of the receiving application program facilitates the discovery of the intended recipient extension object and routes the message accordingly.

The framework of the invention facilitates multiple extensions developed by different parties over time to reuse, interoperate and extend existing infrastructure components. Further, the framework permits the ability to add new user interface (UI) elements as extension objects that proffer additional functionality and yet maintain interoperability with previously released UI components. The invention provides a development methodology for use in any application development environment, permits the addition of functionality without replacing or installing the entire application program by reusing existing common infrastructure, and facilitates a staged release approach where features are enhanced and realized over time via extension objects. In particular, extension object providers provide extension objects that add new communication channels, provide or extend communication protocols, implement secure communication channels by providing authentication and encryption features, and provide additional UI features or elements.

In accordance with one aspect of the invention, a system for a dynamically extensible application program framework includes an application program having functionality and one or more extension objects that modify the functionality during execution of the application program.

In accordance with another aspect of the invention, one or more computer-readable media have computer-executable modules for implementing an extensible application program framework. The modules include one or more extension objects and an application manager module. The extension objects provide functionality to an application program. The application manager module integrates the functionality with the application program during execution of the application program.

In accordance with yet another aspect of the invention, a method dynamically configures an application program. The method includes defining one or more extension objects to provide functionality to the application program. The method also includes integrating the functionality provided by the one or more extension objects with the application program during execution of the application program.

In accordance with yet another aspect of the invention, a system switches between multiple views of a workspace in a user interface. The system includes at least one view extension object and a view selector object. The view extension object provides at least one user interface element for the user interface. The user interface is associated with a dynamically extensible application. The view extension object corresponds to a view selection service object. The view selector object manages the view selection service object to transition a view for the workspace.

In accordance with yet another aspect of the invention, a computer-readable medium stores a data structure representing a header for a message. The message is encapsulated by an extension object in an extension object hierarchy of a dynamically extensible application program. The data structure includes a type field identifying a class of the extension object and a name field identifying the extension object.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
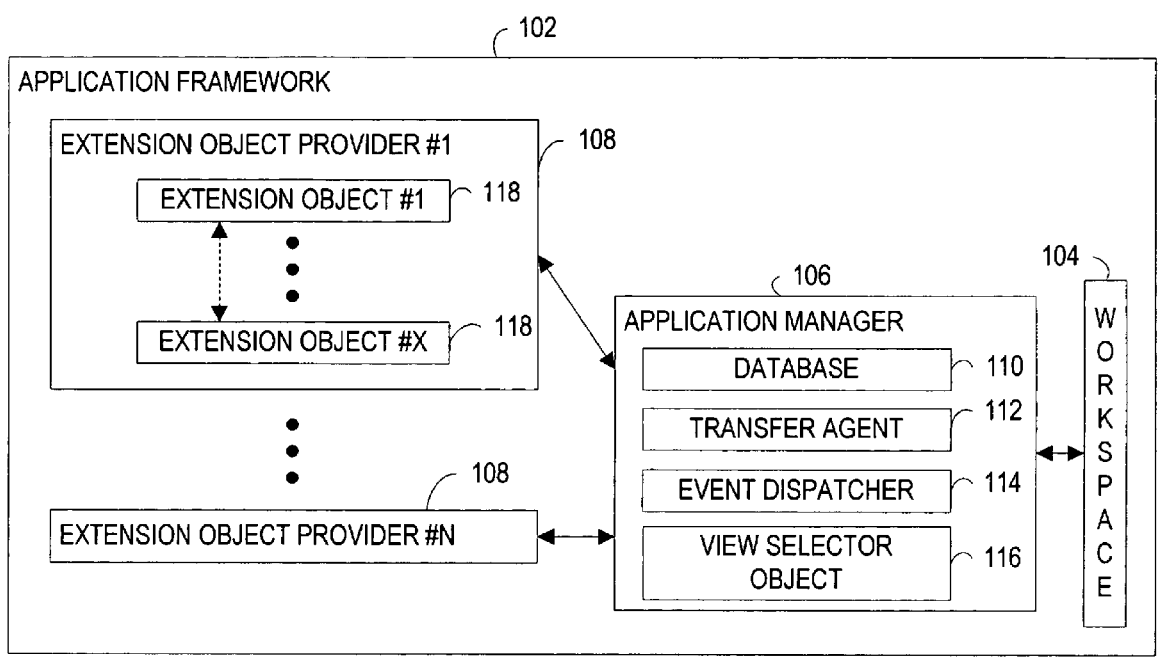
FIG. 1 is an exemplary block diagram illustrating components of the application framework.

Many application programs are multi-tiered, static, and have distinguished structure. To add functionality to these application programs, the application programs are recompiled and delivered in their entirety to end users of the application program. In contrast, for application programs implementing the dynamically configurable framework of the invention, functionality can be added, deleted, or otherwise modified in each layer of the application program via extension objects as illustrated in FIG. 1. With reference to FIG. 1, an application program implemented according to a framework 102 of the invention includes, but is not limited to, a workspace 104, an application manager 106, and one or more extension object providers 108 such as extension object provider #1 through extension object provider #N, where N is a positive integer value. The application manager 106 includes, but is not limited to, a database 110, a transfer agent 112, an event dispatcher 114, and a view selector object 116. Each extension object provider 108 includes one or more extension objects 118 such as extension object #1 through extension object #X, where X is a positive integer value.

To add functionality to an application program implemented in accordance with the invention, an extension object 118 or other component implementing the desired functionality is used to upgrade the application program. That is, the extension objects 118 modify (e.g., add, delete, or replace) the functionality of the application program. The extension objects 118 modify the functionality during execution of the application program. For example, functionality embodied within the extension object 118 may enhance a user interface or provide for additional protocol adaptation at a later time to extend the application program. Those skilled in the art are familiar with implementing and delivering application programs via computer-readable media or via downloading over a network. If protocols (e.g., communication protocols) are developed after the application program has been implemented and delivered, an extension object 118 may be delivered to add a corresponding protocol adapter to enable support for the developed protocol. The extension objects 118 may be developed by a developer of the application program or by third parties. In one exemplary embodiment, the extension objects 118 are instantiated objects as described in the context of object-oriented programming. However, it is contemplated by the inventors that extension objects 118 and the framework of the invention as described herein are applicable in an environment other than an object-oriented environment.

In addition, it is contemplated by the inventors that the invention software may include more or less services and/or components than those illustrated in FIGS. 1-9. In addition, the services and/or components of the invention software may include more or less functionality than the services, components, and functionality described and illustrated herein. In addition, those skilled in the art will note that the framework 102 and software of the invention may implement various communications protocols not specifically limited to the communications protocols described herein. Also, the application program framework 102 may be implemented by different application programs on a single computing device to facilitate communication between the application programs. Alternatively, the application program framework 102 may be implemented by different application programs executing on different computing devices to facilitate communication between the application programs.

One embodiment where such an application program framework can be used is in case of a peer-to-peer application such as instant messaging. In such an application, new functionality such as voice and video communication, file sharing, shared browsing, shared music listening, etc. can be added to the application after the application is initially released. Also, new communications protocols may be added to the application either to support new functionality or to enable this functionality between different kinds of peers. In an example of the latter, one peer is a user on one instant messaging service and the other peer is a user on another instant messaging service. Note that this is only one example of an application which could use such an application framework to extend functionality over time.

Figure 2:
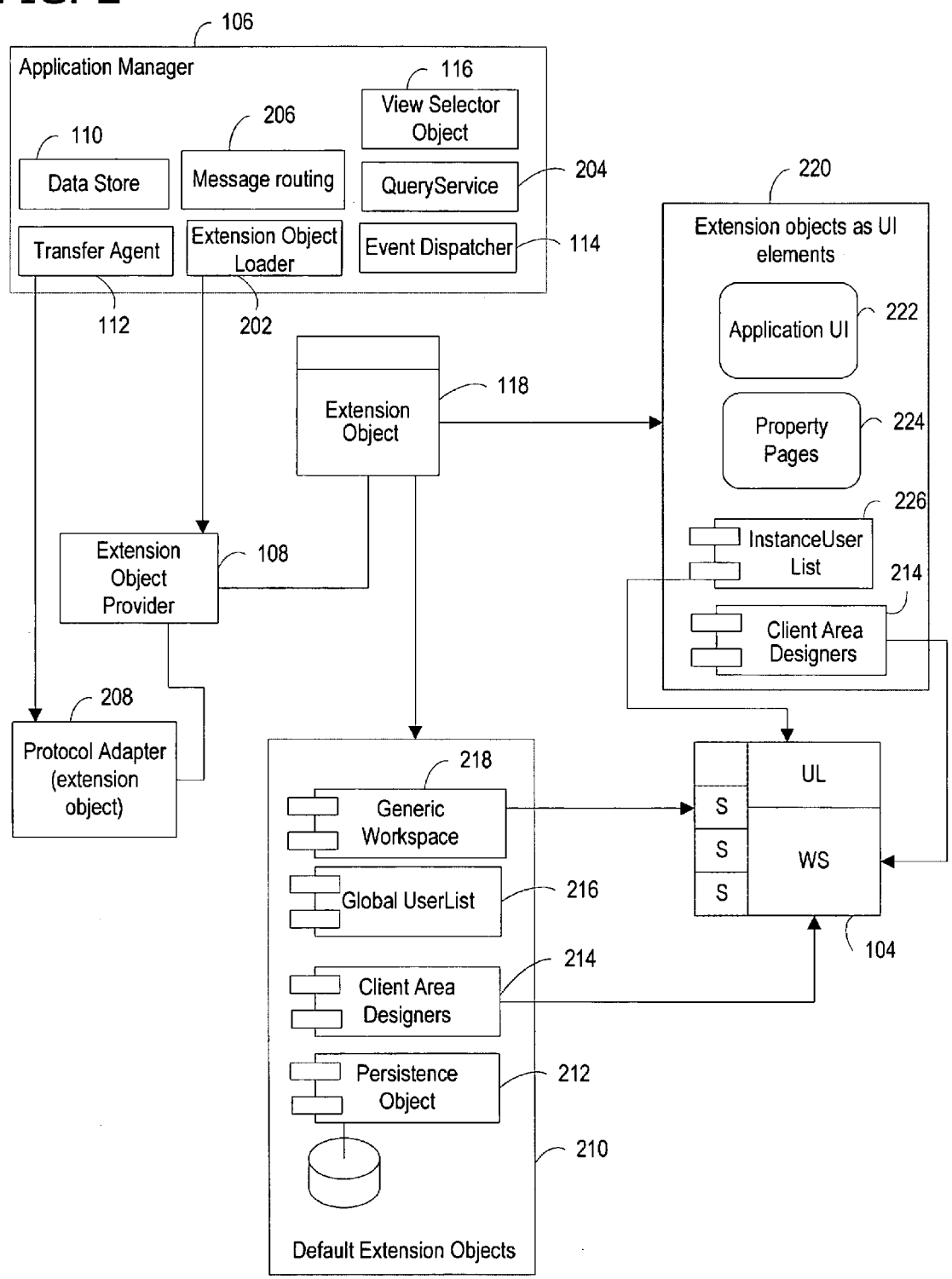
FIG. 2 is an exemplary block diagram illustrating interaction between the components of the application framework.

In one embodiment as illustrated in FIG. 2, components of the framework 102 include the application manager 106, one or more extension object providers 108, one or more extension objects 118, and one or more workspaces 104. In addition, communication between components of the framework 102 and between frameworks 102 is implemented via messages. Depending on the type and needs of the application program to be implemented, one or more of the components illustrated in FIG. 2 are included with the application program. In one embodiment, no extension objects 118 are included in application programs that are shipped initially to the end user. Later, as additional functionality is requested, extension objects 118 implementing the requested functionality are shipped to the end user. For example, communicative application programs (e.g., application programs that communicate with other application programs or other computing devices) utilize the transfer agent 112 within the application manager, so the transfer agent 112 is included with the application manager for those communicative application programs. The transfer agent 112 is not included with the application manager 106 for non-communicative application programs.

In the illustrated embodiment, the framework 102 includes default extension objects 210 and extension objects as UI elements 220. Further details of the application program framework 102 are described in the following sections.

Application Manager

The application manager may include one or more of the following: the database 110, the transfer agent 112, the event dispatcher 114, the view selector object 116, an extension object loader 202, a query service 204, and a message routing module 206 for routing messages within a particular application program.

When the framework 102 is initialized at application program startup, the framework 102 creates the application manager 106. This centralized component manages requests for specific functionality by other components (e.g., extension objects 118) that are loaded within the framework 102. Simultaneously, the application manager 106 services requests from extension objects 118 which are currently loaded to obtain the identity to other extension objects 118 that may be installed later to provide other specific functionality. When a request for specific functionality is received by the application manager 106, the application manager 106 queries the database 110 to locate the appropriate extension object provider 108, checks the validity of the request and of the provider 108, instantiates the appropriate extension object 118, obtains the required interfaces, and identifies the instantiated extension object 118 to the requesting component. For example, the application manager 106 may return a reference, handle, or pointer of the instantiated extension object 118 to the requesting component. In one embodiment, extension objects 118 are created in response to a request from other extension objects 118 or the application manager 106 with the exception of specific framework objects such as those that provide the basic functionality of the application manager 106. Certain extension object providers 108, however, can register to have their extension objects 118 be loaded at startup.

In addition, as described below, the application manager 106 facilitates discovery and resolution between multiple extension object providers 118 and provides message/event routing within the application program framework 102. In particular, previously installed extension objects 118 can discover newly installed extension objects 118. The application manager 106 also facilitates discovery between application programs on the same computing device or on different computing devices. For example, an application program can discover whether another application program supports a given protocol. In one embodiment, extension objects 118 that are specifically used for communication are discovered, resolved, and loaded by the transfer agent 112 within the application manager 106.

Extension Object Providers

In one embodiment, extension object providers 108 are executables that house one or more extension objects 118, described in greater detail below. Extension object providers 108 implement specific interfaces through which the version of the extension object provider 108 can be verified, certificates can be used to check for authenticity and validity of the extension object provider 108, and instances of the housed extension objects 118 can be instantiated. Those skilled in the art will appreciate that a single executable could provide multiple extension objects 118 such as illustrated in FIG. 2. When an extension object 118 is instantiated, the instantiated extension object 118 may request functionality that is proffered by other extension object providers 108. In such cases, the other extension object providers 108 will also be loaded by the application manager 106.

Upon installation, extension object providers 108 register with the database 110 of the application manager 106. That is, the extension object providers 108 contribute registration information such as presence information and housed extension objects 118 to the database 110 in the application manager 106 to register with the framework 102. Optional authentication routines can be performed at this stage to prevent rogue executables from registering themselves with the framework 102. For example, the application manager 106 may ask the registering extension object provider 108 for a certificate or other credential to verify that the registering extension object provider 108 was obtained from an authorized or otherwise trusted source.

Extension Objects

Extension objects 118 proffer additional functionality or augment existing functionality of the framework 102. The extension objects 118 are not limited or bound to any application logic layer. For example, the extension objects 118 may include new functionality added to the application or proffer UI elements 220 to existing functionality. The UI elements 220 may include an application UI 222, property pages 224, an instance user list 226 that needs to be displayed on the UI, or client area designers 214. The application program framework 102 services these objects 220 by routing the appropriate messages to the workspace windows 104.

Some extension objects 118 proffer UI within workspaces 104 as plug-ins. In addition to the interfaces implemented by the extension object providers 108 described above, plug-in extension objects 118 support interfaces that are sited within the workspace windows 104 and are able to persist and recreate themselves from instance data.

Protocol adapters 208 are one form of extension objects 118 that establish and authenticate peer-to-peer connections and perform data transfers when a message is to be transacted. The protocol adapters 208 listen to communication port events and may be instantiated when the framework 102 is initialized or when communication functionality using the specific protocol is requested by some other extension object. When an event occurs on the bound port, the protocol adapters 208 raise an application program framework event that is routed to the event dispatcher 114 within the application manager 106 through the transfer agent 112.

Figure 3:
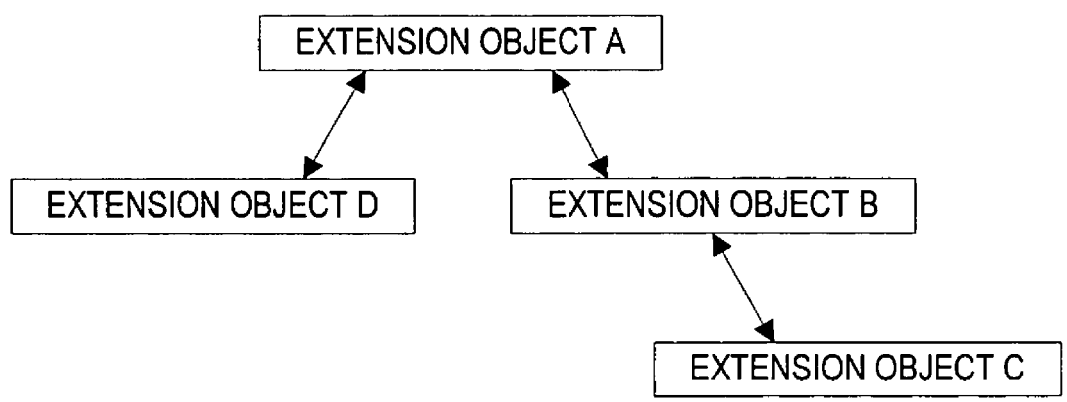
FIG. 3 is an exemplary block diagram illustrating a hierarchy of extension objects.

Referring now to FIG. 3, in one embodiment of the application program framework 102, a hierarchical relation may exist amongst extension objects 118. In FIG. 3, extension object A communicates with extension object B while extension object B communicates with extension object C. In this example, extension object A communicates with extension object B and extension object D, but has no direct communication with extension object C. In this example, extension object A may communicate with extension object B to solicit the services of extension object B. The functionality of extension object B is never exposed outside the context and hierarchical relationship of extension object A. Such hierarchies are utilized within the workspace window 104 to provide alternate views and layout of the UI (see below for details).

With further reference to FIG. 2, default extension objects 210 are extension objects 118 made available by the framework 102 to facilitate basic functionality such as persistence. Extension object providers 108 can provide overriding functionality that supersedes the default extension objects 220. Exemplary default extension objects 220 include a persistence object 212, a client area designer 214 (e.g., a UI element), a global user list 216, and a generic workspace 218. The generic workspace 218 is a generic window that provides a client area where UI extension objects expose their UI and have selection and context-sensitive UI interaction.

In the extensible application program framework 102 of the invention, the extension object provider 108 and the extension object 118 are often cached when first referenced and subsequent references to the extension object 118 are resolved to the cache. Furthermore, because the run-time environment resolves the first reference to an extension object 118 to the appropriate extension object provider 108, extension objects 118 can be instantiated or otherwise activated at application program run-time rather than at application program compile-time. This permits the deployment of application logic components (e.g., objects) as well as UI elements in staged releases where all components seamlessly interact and realize the additional functionality enabled by the newly-instantiated components.

In operation, extension objects 118 proffer their services to the application manager 106. For example, an extension object 118 providing chat functionality provides other services (e.g., secondary functionality) such as voice chat UI views. The secondary functionality becomes available to all other extension objects 118 through the application manager 106 after the extension object 118 proffers the secondary functionality to the application manager 106. In addition, extension objects 118 inform the application manager 106 of needed support, and the application manager 106 checks the database 110 to determine whether such support exists via one or more other previously-loaded extension objects 118. The application manager 106 provides, to the requesting extension object 118, a pointer to the extension object 118 having the requested functionality.

For example, an extension object 118 or another similar application program on the same machine or a peer machine may ask the application manager 106, via the query service 204, whether the application program supports voice chat. The application manager 106 loads and initializes the voice chat extension object and provides the interface for the chat service to the requesting extension object 118. It is contemplated that a first application program may ask the application manager 106 of a second application program whether the second application program has chat capability. The first application program communicates with the second application program via the chat extension object of the second application program. In such a manner, the application manager 106 of the second application program acts as a broker to provide the service. The application manager 106 of the second application program may need to load and initialize the previously installed chat extension object to render the object functional. In this example, a graceful degradation of end user experience occurs when different peers may or may not have specific extension objects installed due to different versions of programs or due to other reasons.

Workspaces

The workspace 104 is a top-level window that is created by the application manager 106 and maintained by the application program framework 102. The framework 102 routes UI messages between the workspace windows 104 and the plug-in extension objects 118 that proffer and site their UI within the workspace windows (e.g., the extension objects UI elements 220). There could be more than one type of workspace 104 in a given application program and each workspace 104 is uniquely identifiable by a unique workspace identifier. For example, each workspace 104 may be associated with a unique identifier such as WorkSpaceID, which may be a 128-bit globally unique identifier (GUID).

When a workspace window 104 is closed, the workspace state is persisted along with the plug-in extension object identities and instance data. On creation of a workspace 104 with a specific workspace identifier, the framework 102 utilizes the persisted data (if any) to reconstruct the UI layout and state. As with other extension objects 118, the UI plug-in extension objects are created and initialized on demand.

Figure 4:
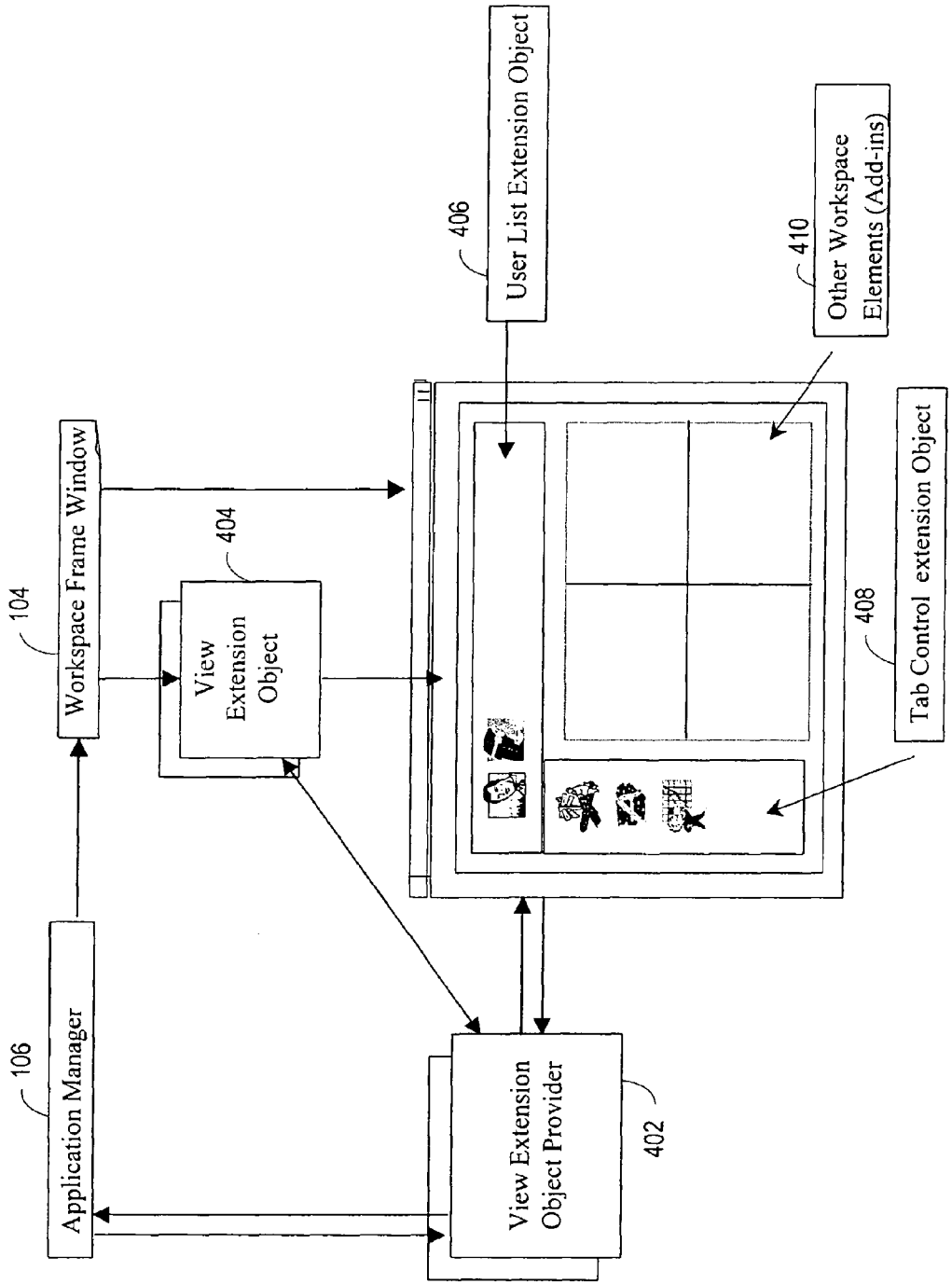
FIG. 4 is an exemplary block diagram illustrating interaction of view extension objects with a workspace.

Within the context of a workspace window 104, extension object providers 108 are contextually referred to as view extension object providers 402, as illustrated in FIG. 4. The view extension object providers 402 divide the client area of a given workspace 104 and site or otherwise locate plug-ins in the regions that are managed by the view extension object providers 402. The view extension object providers 402 and instantiated view extension objects 404 facilitate alternate layouts within a workspace window 402. As shown in the example of FIG. 4, a user list extension object 406, a tab control bar extension object 408, and other workspace elements 410 are sited in regions of the workspace window 104 that are managed by a view extension object provider 402.

There can be multiple workspaces 104 for a given application program. For example, there can be a first workspace for communication between a first extension object (or application program) and a second extension object in addition to a second workspace for communication between the first extension object and a third extension object. The first workspace is completely independent of the second workspace. For example, there may be one workspace for a user A to communicate with a user B using chat and another, separate workspace for the user A to communicate with a user C using voice and chat. In this example, there is a separate chat window in each of the workspaces. In addition, there can be more than one view extension object provider 108 associated with a given workspace 104. This will provide multiple selectable views for a given workspace 104. This concept is further described below.

In one embodiment, the workspace window 104 is associated with another peer, a group of peers, or a device. For example, user A may have workspace 104 opened and associated with a peer such as user B. The workspace 104 has a unique identifier such as WS_USERA_USERB. In this example, an extension object 118 (e.g., a plug-in) that supports chat functionality is available within the workspace 104. When the workspace 104 is closed on user A's machine, the data pertaining to the chat extension object and associated with workspace WS_USERA_USERB is persisted on user A's machine. When the workspace 104 is later created with the identity WS_USERA_USERB, the chat extension object is re-instantiated and initialized with the association to user B. Similarly, the data pertaining to the chat extension object and associated with workspace WS_USERA_USERB is persisted and reloaded on user B's machine. Through a communication channel established between the peer machines of user A and user B, data including workspace identities are synchronized on initial workspace creation. Subsequent communications on workspace WS_USERA_USERB carry this identifying signature.

Extending Workspaces through View Extension Object Providers

Figure 5:
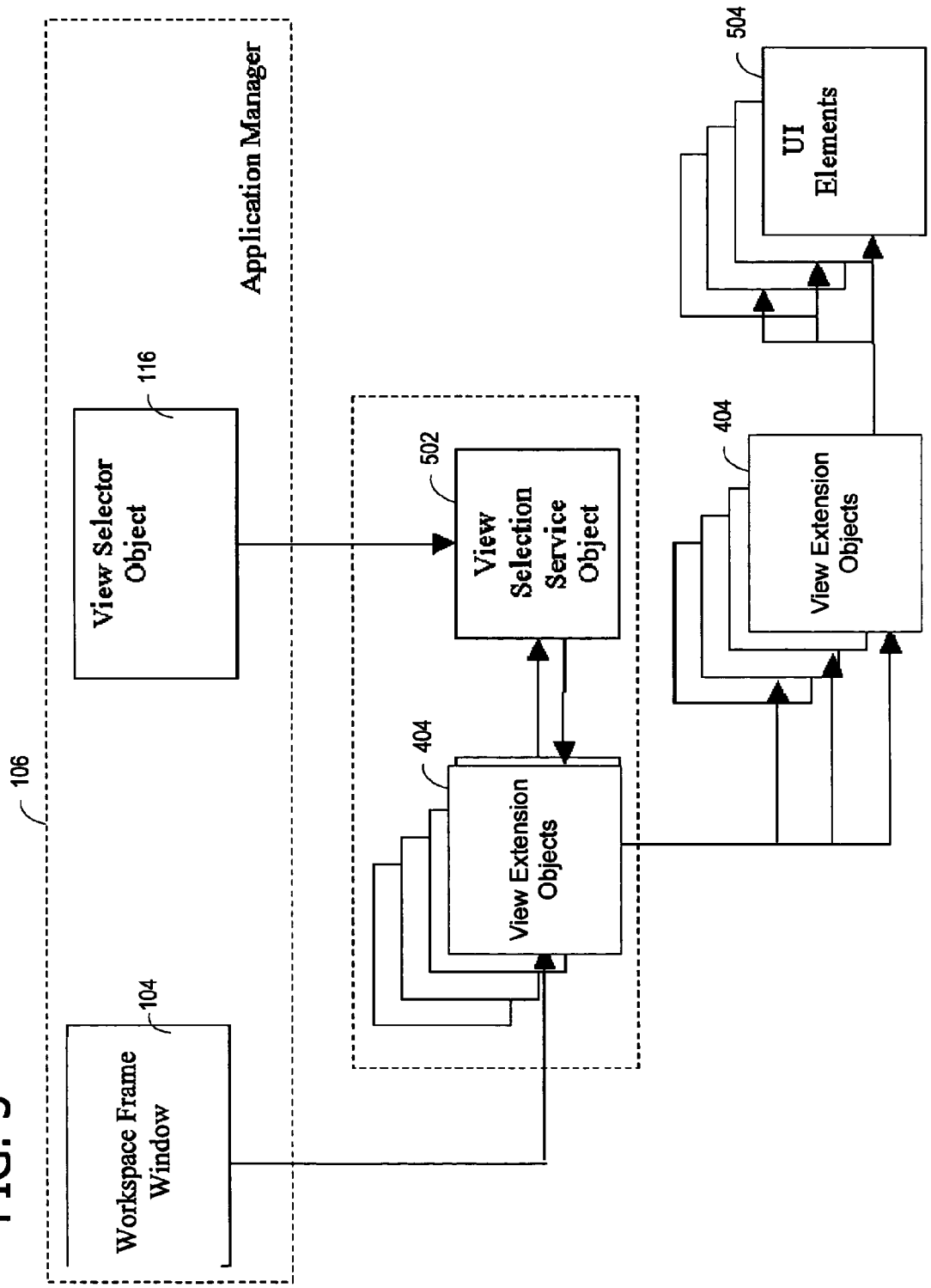
FIG. 5 is an exemplary block diagram illustrating workspace extension through view extension object providers.

As illustrated in the example of FIG. 5, a workspace window 104 operates with at least one view extension object provider 402, at least one view extension object 404, and at least one UI element 504. One or more view extension objects 404 manage UI elements 504 and their placement within the workspace window 104. A view extension object 404 includes one or more UI elements 504 and is responsible for providing a particular look and feel, placement, state management, message routing, and persistence. UI elements 504 provide specific UI pieces to the workspace through view extension objects 404. For example, the User List, Tab Control Bar, and other WorkSpace UI element areas of FIG. 4 are view extension objects 404 that may be provided by a single view extension object provider 402. This enables the view extension object providers 402 to proffer different UI view extension objects 404 and UI elements 504. Hence, a given workspace 104 can support multiple views. The relationship between the workspace 104 and the associated view extension provider 402 is determined the persisted workspace instance data (or defaults as determined by the database 110 in the application manager 106). The relationship between multiple view extension providers 402 is determined by the database 110 in the application manager 106.

As outlined in FIG. 5, when one or many view extension providers 402 provide multiple views for a given workspace 104, the application program framework 102 enables a common mechanism and UI to manage the selection of these alternate views. When more than one view is available for a given workspace 104, the application program framework 102 enables a view selector object 116 or other view selection context manager to switch between views. To facilitate this, each view extension object provider 402 that provides view extension objects 404 registers their availability with the view selector object 116 through view selection service objects 502. Each view extension object 404 has a corresponding view selection service object 502, which is registered with the application program framework view selector object 116. This data is stored in the application manager database 110 to resolve associations. When the framework 102 detects the possibility of using multiple views within a given workspace 104, the framework 102 displays a view selector UI and calls the appropriate view selection service object 502 to transition the view (activation/de-activation) and restore state. The workspace frame window 104 informs individual views via message routing (both application message and default windows messages) and command routing (e.g., user commands) to resize, move, or adjust as necessary in response to events such as user selections and inputs. In a chat application program example, when a first user on one end of the chat changes views (e.g., changes the background color), that change occurs for a second user on the other end of the chat. That is, the application manager 106 associated with the chat extension object of the first user informs the application manager 106 associated with the chat extension object of the second user of the view change. The application manager 106 sends an application message to the chat extension object of the second user to change the currently active views.

In one embodiment, the view selector object 116 is associated with the application manager. It is contemplated by the inventors that the view selector object 116 may be separate from the application manager 106.

Events, Messages, and Notifications

Extension objects 118 register with the application manager 106 to receive messages. Extension objects 118 can broadcast messages through the application manager 106 by using functionality exposed by the application manager 106. For example, a software routine such as BroadcastMessages( ) is available from the application manager 106. The broadcast messages are sent to all objects that have registered themselves to receive the messages of a given type.

In a distributed application program environment, messages and notifications could be originated and targeted to extension objects 118 that have not yet been instantiated if the extension objects 118 have registered themselves in the application database 110 to receive such messages even if they have not been instantiated. The invention software constructs, routes and handles these messages within the application program framework 102 as herein described.

The various plug-ins or extension objects 118 can use the communication channel provided by the framework 102 to communicate with a similar application program on the peer machine. This communication channel is itself an extension object 118 proffered by extension object providers 108, thereby allowing new types of communication channels with their own connection and authentication protocols to be added later as needed. The extension objects 118 using a communication channel provided by the framework 102 define their own message types based on the kind of functionality the extension objects 118 add to the application program.

Figure 6:
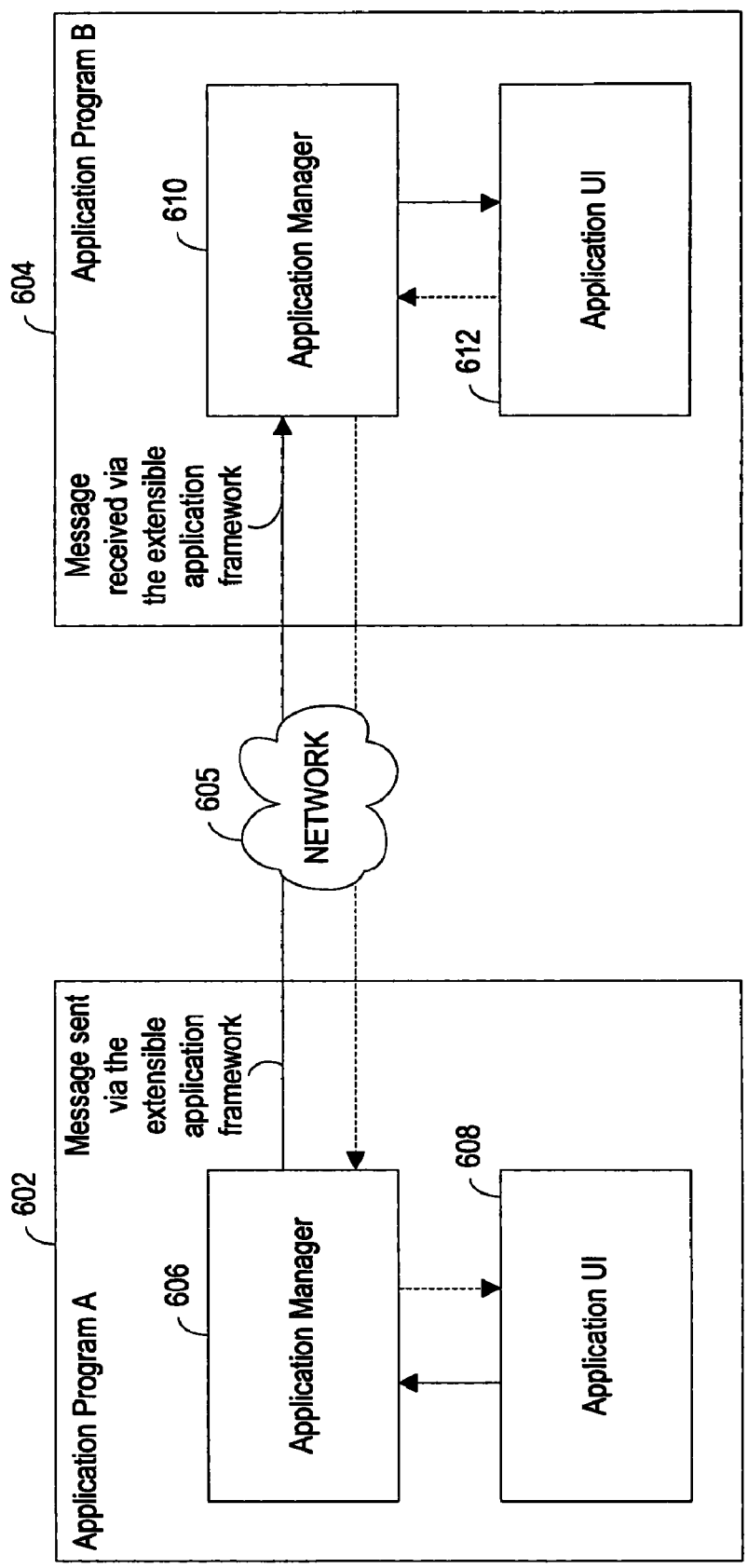
FIG. 6 is an exemplary block diagram illustrating communication between applications via the extensible application framework.

As illustrated in FIG. 6, application A 602 and application B 604 communicate via a peer-to-peer connection across network 605. An application UI 608 receives a message or other input from a user for delivery to a user of application B 604. The application UI 608 communicates the message or input to an application manager 606 of application A 602. Application manager A 602 sends the message to application B 604 via the application framework of application A 602. An application manager 610 of application B 604 receives the message via the application framework of application B 604. Application manager 610 communicates the message to an application UI 612 of application B 604 for display to the user of application B 604.

For example, a chat extension object defines the structure of a chat message and includes logic on how chat messages are generated and how these messages are received, parsed, and rendered. When a user sends a chat message, the chat extension object generates a chat message and sends it to the workspace (e.g., application UI 608) under which the chat extension object is housed. The workspace provides its own workspace specific identification headers (e.g., Workspace ID such as WS_USERA_USERB) and routes the message to the extension object (e.g., protocol adapter) that provides the communication channel via the application manager (e.g., application manager 606) and the transfer agent. When the message is received by the peer's application program (e.g., application program B 604), the extension object (e.g., protocol adapter) that provides the communication channel routes the message to the appropriate workspace (e.g., application UI 612) via the application manager (e.g., application manager 610) and the transfer agent. The workspace parses the workspace-specific information and routes the message to the chat extension object on the peer's machine that parses and renders the chat message.

Since the extension objects 118 are hierarchical, each extension object 118 defines its own message type. These messages are wrapped with appropriate message headers by the parent extension objects and forwarded to the peer application program where the appropriate portion of the message will be read and interpreted by the appropriate extension objects 118. As such, different types of extension objects 118 can be created over time that can reuse an existing communication infrastructure for sending and receiving messages specific to the extension objects 118.

Each extension object 118 can choose to encrypt its messages in such a way that only an instance of that extension object 118 on the peer application program can decrypt the encrypted message using a key known only to that extension object 118. As such, security can be added to an existing communication channel for features that require secure communications. For example, the communication channel provided by an extension object 118 can be used for both transmitting chat messages and for file transfers. Chat messages may not require secure communication whereas the file transfer messages may require security. The file transfer extension object may encrypt the file transfer messages and use the same communication channel used for sending unencrypted chat messages.

An error condition is generated when a particular extension object 118 is unavailable on a layer of the routing hierarchy at the destination peer machine that parallels that of the sender. In this case, the layer where the routing fails may instantiate a default handler that fits the category of the intended recipient extension object type or return the error code through the messaging chain to the sender.

Message Sending

Figure 7:
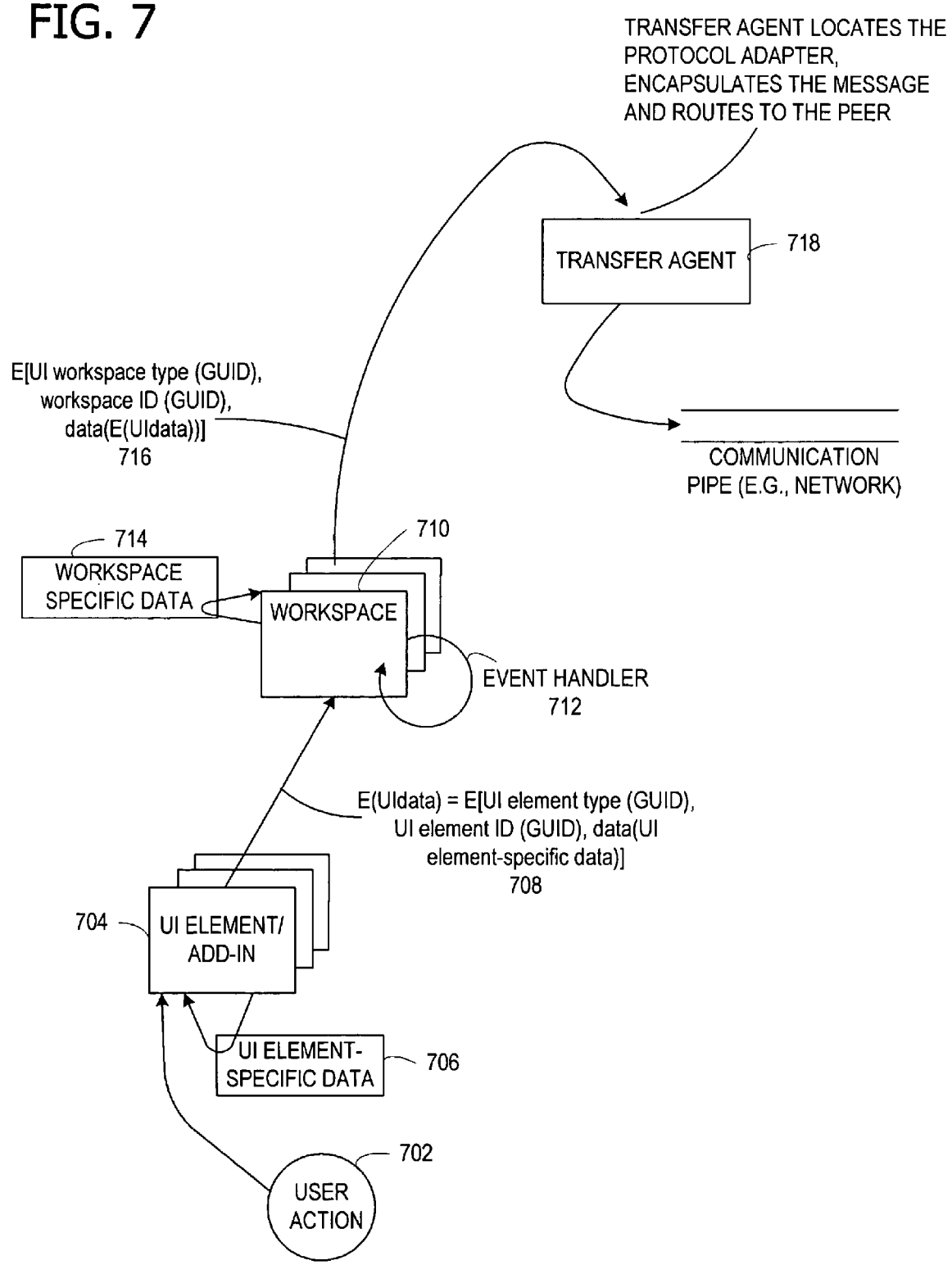
FIG. 7 is an exemplary block diagram illustrating sending a message via the transfer agent.

As described above, a message can be routed through the hierarchy of extension objects 118. FIG. 7 illustrates encapsulating and sending a message via a transfer agent, such as transfer agent 112. At each level in the hierarchy, the message data is encapsulated with an envelope specific to the extension object 118 at that level in the hierarchy. Each envelope identifies a schema and content of the extension object 118. The extension object 118 and the associated extension object provider 108 determine organization within the envelope. An exemplary nested envelope structure at level K in the hierarchy includes a layout with an extension object type, an extension object identity at level K, and data for level K. The extension object type and the extension object identity may each be represented as a globally unique identifier (GUID). The data for level K may include envelopes from any subordinate levels K-X in the hierarchy where K and X are positive integer values. Encryption may occur at any and all levels in the hierarchy.

FIG. 7 illustrates a general extension object hierarchy and data encapsulated within each extension object level envelope. A user action 702 produces UI element-specific data 706 in a UI element 704. The UI element 704 encapsulates the UI element-specific data 706 into an envelope. For example, the encapsulation with headers may be represented as:

$$E(\text{UI Data}) = E(\text{UI element type (GUID)}, \text{UI element ID (GUID)}, \text{data(UI element-specific data)}) \quad (1)$$

In (1), UI element type identifies the type of UI element 704, UI element ID identifies the specific UI element 704, and data(UI element-specific data) represents the UI element-specific data 706.

Once the workspace extension object 710 receives data as a nested envelope (1) from an extension object subordinate in the hierarchy of extension objects (e.g., UI element 704), the workspace extension object 710 encapsulates the received data within its own envelope that is stamped with workspace-specific data 714 such as its workspace type and identity. The workspace extension object 710 operates on the received envelope (1) via an event handler 712. For example, the encapsulation by the workspace extension object 710 may be represented as:

$$E(\text{workspace type (GUID)}, \text{workspace ID (GUID)}, \text{data}(E(\text{UI Data}))) \quad (2)$$

In (2), workspace type identifies the type of workspace extension object 710, workspace ID uniquely identifies workspace extension object 710, and data(E(UI Data)) represents the encapsulated data received from the UI element 704.

Based on the protocol used or recommended by the workspace, the workspace extension object 710 interrogates the transfer agent 718 for a suitable protocol adapter. Since the communicating workspaces maintain an association between peers (e.g., between user A and user B in the above example), the identity and destination of the intended recipient is known. The transfer agent 718 transmits the outbound message using the appropriate communications protocol adapters.

In one embodiment, the invention software utilizes a transmission control protocol/Internet protocol (TCP/IP) as the transport and other protocols for authentication. In the instant messaging embodiment of the invention, network addresses are determined by user association and application programming interface (APIs) calls in an instant messaging server.

Message Receiving

Figure 8:
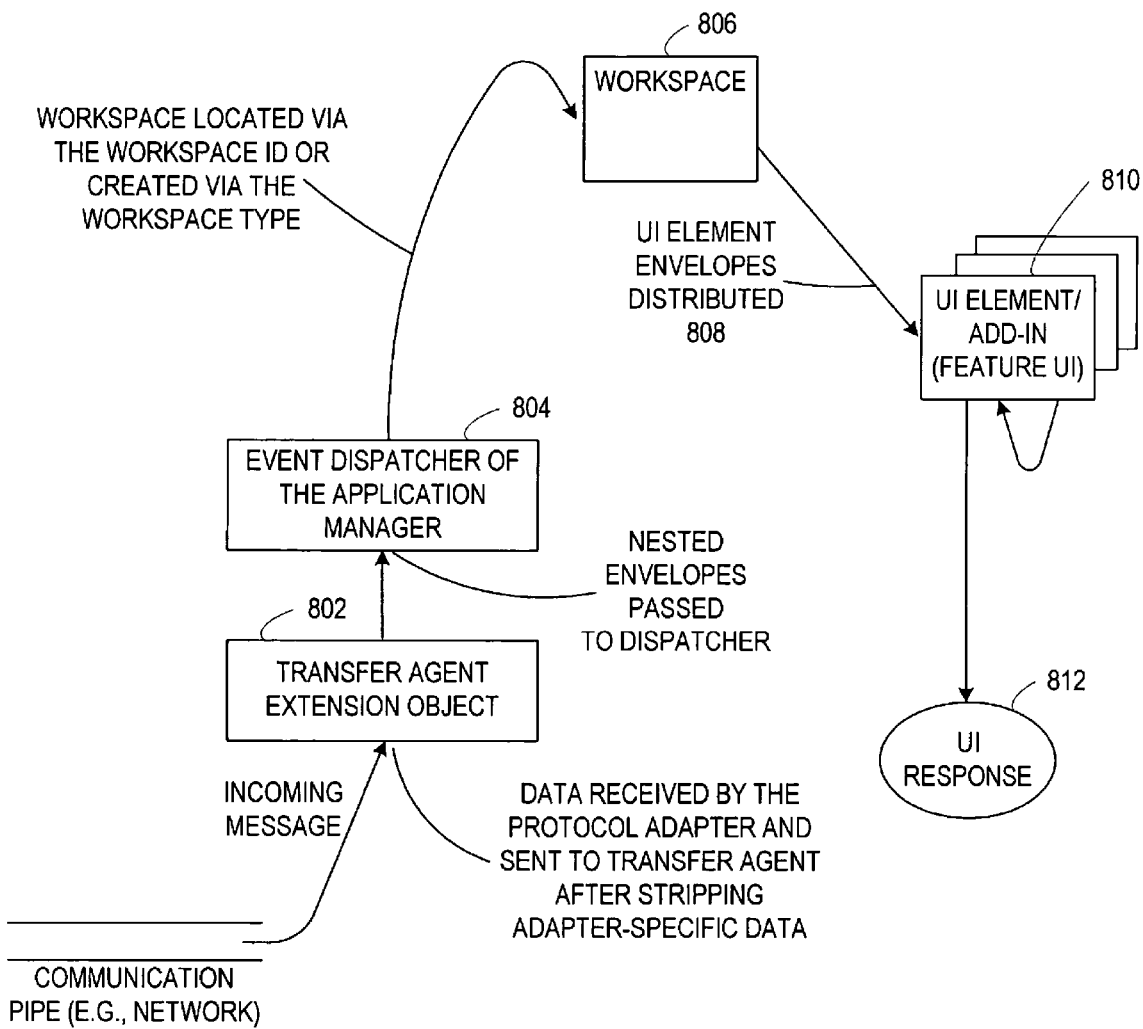
FIG. 8 is an exemplary block diagram illustrating receiving a message via the transfer agent.

As illustrated in FIG. 8, connections and messages inbound from an application program are received by the protocol adapter extension objects of the receiving application program that strip the data specific to the protocol adapter (e.g., to perform peer authentication) and send the message to the transfer agent 802. Once the data has been received, the transfer agent 802 raises an application event through the event dispatcher 804 of the application manager of the receiving application program. The event dispatcher 804 strips the first envelope and reads a first portion of the data including the workspace type and workspace identifier. Utilizing this data, the associated workspace 806 is located if available, or created if unavailable. A second portion of the received data (e.g., the remaining portion) is delivered to the identified workspace 806. For example, a software routine delivers the received envelope to the identified workspace 806. The workspace 806 then strips the workspace specific data from the message envelope (e.g., another first portion) and reads in the data (e.g., another second portion) intended for the extension objects (e.g., UI element 810) contained within the workspace 806. The extension object type and identifier that is stored in each envelope (e.g., as the first portion) is utilized by the workspace 806 to locate or create the extension object (e.g., UI element 810). This process repeats until all received envelopes are stripped and data (e.g., the second portion) distributed to the appropriate extension objects. If a hierarchy of extension objects exists, each receiving level of extension object strips the data encapsulated for that level. Incoming messages may include extension object identifiers to indicate the recipient extension objects. The extension object identifiers may cause the application manager to load the extension objects. In the example of FIG. 8, UI element 810 displays the received message as a UI response 812 to the user.

Extending the Communications Framework through Extension Providers

A communication channel between application programs running on peer machines can be implemented through extension object providers 108 so that additional extension objects 118 can be added at a later stage to implement different means of establishing connections, different means of authentication and different mechanisms for data transfer. As discussed above, such extension objects 118 are referred to as protocol adapters 208. Protocol adapters 208 extend the design to handle different methods of establishing and authenticating connections, different protocols of data transfer, and to allow extension object providers 108 that add UI functionality to determine their own transaction procedure to exchange functionality specific messages. For example, the transaction procedure for messages to allow peers to draw on a shared whiteboard would be different from the procedure for file sharing messages.

Figure 9:
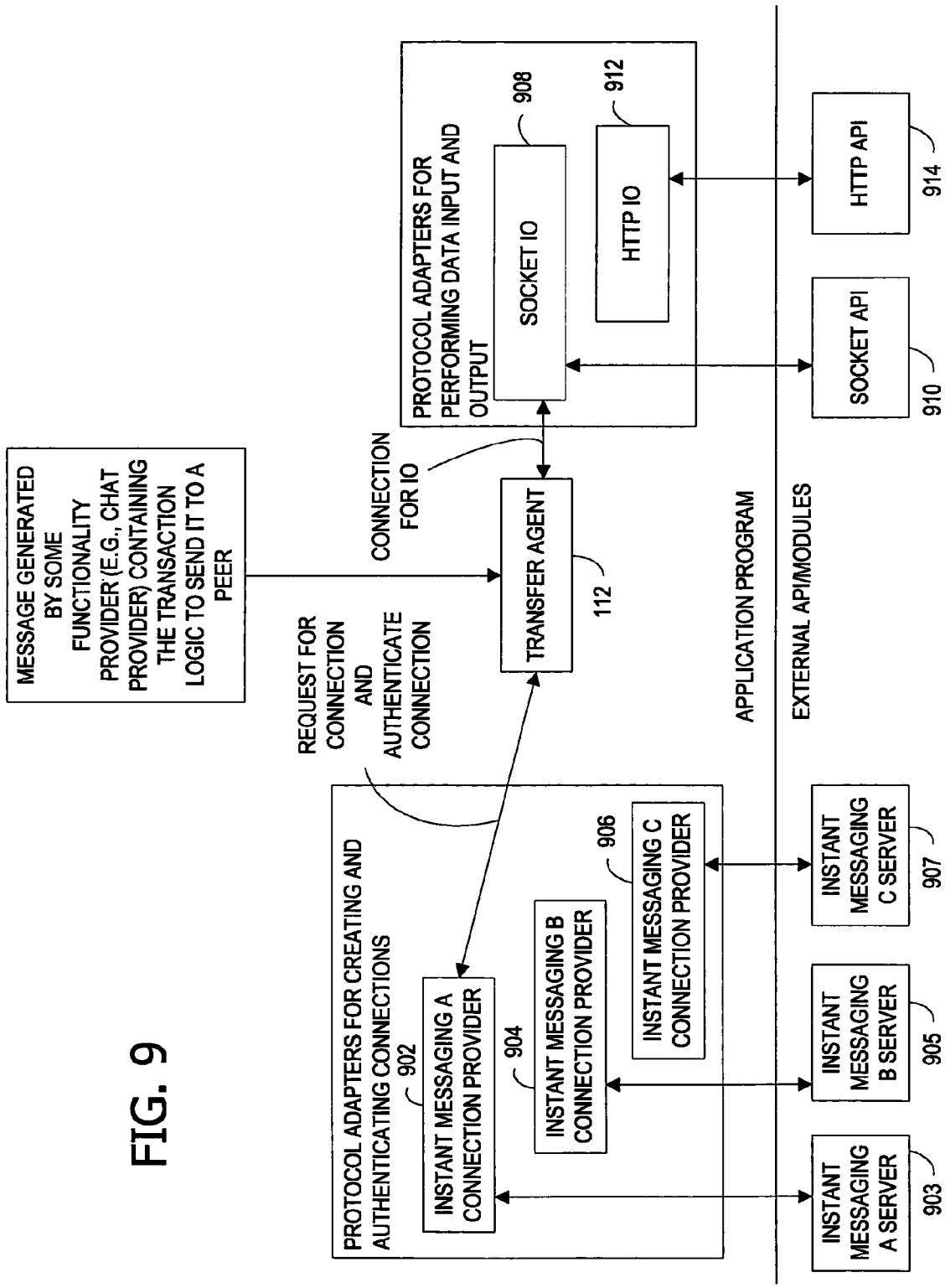
FIG. 9 is an exemplary block diagram illustrating operation of protocol adapters.

As shown in the FIG. 9, the transfer agent 112 is the central framework object that handles all peer-to-peer communication. The transfer agent 112 employs protocol adapters for creating and authenticating connections as well as for performing data input and output. For example, when a message created by an extension provider 108 in a workspace 104 is received by the transfer agent 112 to be sent to a specific user, the transfer agent 112 determines that the user is a buddy on a specific instant messaging (IM) server such as IM server A 903, IM server B 905, or IM server C 907. The transfer agent 112 uses the appropriate extension object that can establish a peer-to-peer connection to the peer on the specific IM server. For example, if the user is a buddy on IM server A 903, then IM A connection provider 902 is used as the protocol adapter for sending the message the user. Similarly, if the user is a buddy on IM server B 905, then IM B connection provider 904 is used as the protocol adapter for sending the message the user. Further, if the user is a buddy on IM server C 907, then IM C connection provider 906 is used as the protocol adapter for sending the message the user.

When the connection is established, the transfer agent 112 identifies the type of connection and loads the appropriate protocol adapter extension object to handle the data transfer. For example, if the transfer agent 112 determines the connection to be a transmission control protocol/Internet protocol (TCP/IP) socket connection (e.g., communicating with an external socket API 910), the transfer agent 112 loads the appropriate extension object (e.g., socket UI 908) for handling data input and output on socket connections and uses it to handle the data transfer. The protocol used for the exchange of data is defined in the message body that was generated by the extension object provider 108 that provided the specific functionality within the workspace 104.

If functionality is to be added later for the application program to communicate with users on another specific IM server, an extension object provider 108 could provide functionality through protocol adapters to establish connections to an application program on a peer machine if the peers are on the other specific IM server. Similarly, if the type of connection is an HTTP network connection, a different protocol adapter (e.g., HTTP IO 912) could be instantiated (e.g., plugged in) to handle the data input and output to communicate with an external HTTP API 914.

The database 110 in the application manager 106 stores information on the registered extension object providers 108 for peer-to-peer communication. For example, such information associates the appropriate protocol adapters to be used for transferring messages via specific protocols. Optionally, when extension object providers 108 that provide a specific functionality create messages, the extension object providers 108 can specify recommended, registered, communication protocol adapters to be used for transferring those messages. Such recommended protocol adapters supersede any default protocol adapter used for communication or authentication.

Exemplary Operating Environment

Figure 10:
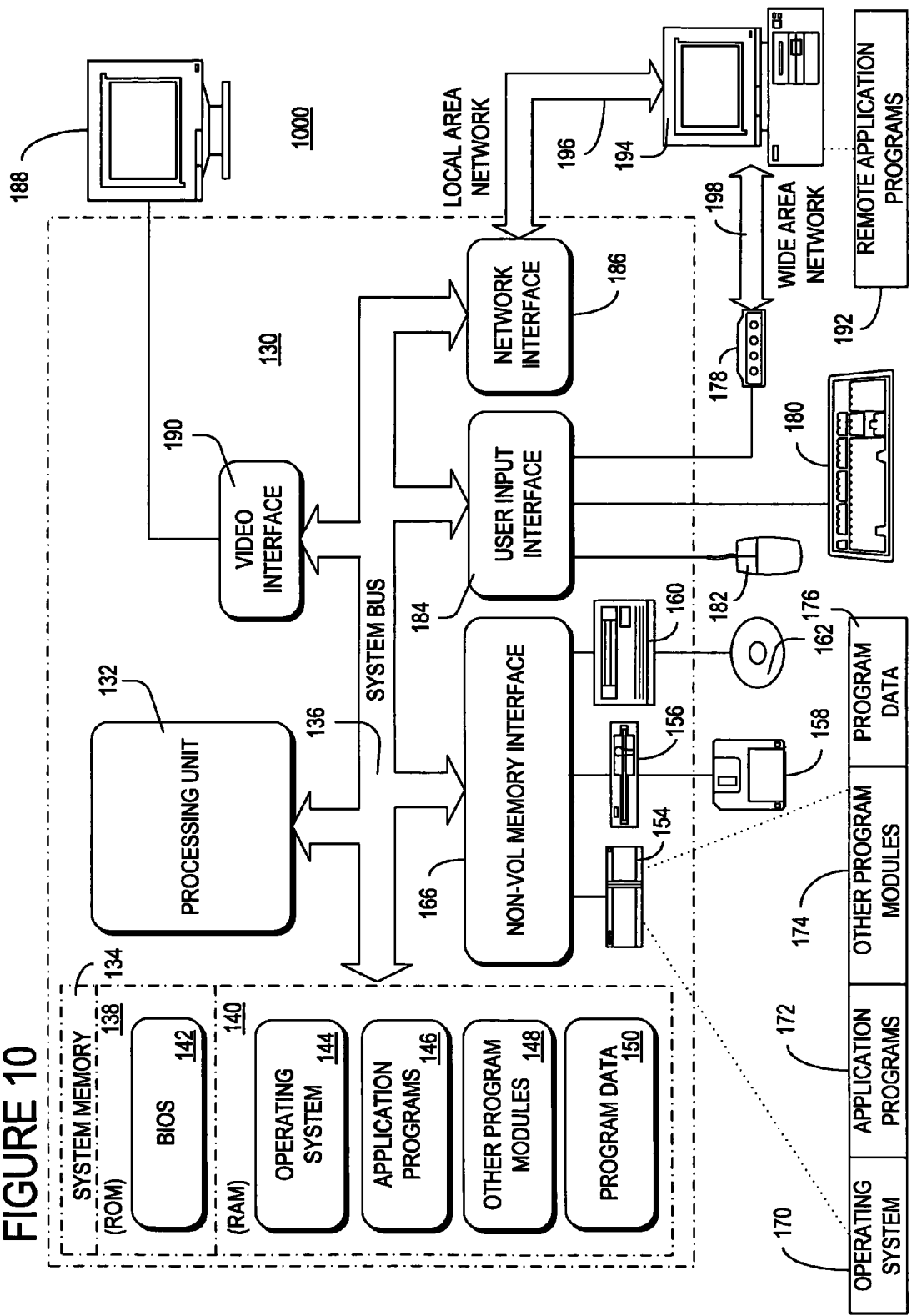
FIG. 10 is a block diagram illustrating one example of a suitable computing system environment in which the invention may be implemented.

FIG. 10 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 10 illustrates operating system 144, application programs 146, other program modules 148, and program data 150.

The computer 130 may also include other removable/non-removable, volatile/nonvolatile computer storage media. For example, FIG. 10 illustrates a hard disk drive 154 that reads from or writes to non-removable, nonvolatile magnetic media. FIG. 10 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 10, provide storage of computer readable instructions, data structures, program modules and other data for the computer 130. In FIG. 10, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 10 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 10 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIGS. 6-9 to dynamically configure an application program by integrating functionality provided by one or more extension objects with the application program during execution of the application program.

EXAMPLES

The following examples illustrate the invention. In one embodiment, the application programs implementing the application program framework 102 of the invention are communication-centric peer-to-peer application programs. An application program on one machine communicates and exchanges data with a similar application program on another machine. The framework 102 provides a common channel of communication that is leveraged by all extension object providers 108 that extend the application program functionality. Though this embodiment is specific to a peer-to-peer application program, the application program framework 102, discovery of extension object providers 108, and message formulation and routing are applicable to any type of application program.

In another example, customers that design and manufacture audio digital signal processing devices with audio effect processing capabilities such as three dimensional process acceleration, mixing, digital encoding/decoding, or object acceleration could implement the application program framework 102 of the invention for audio drivers to expose hardware features as individually controllable extension objects 118 in an operating system environment. With more and more feature-rich audio devices equipped with powerful digital signal processing capabilities, the operating system audio stack implemented according to the invention allows a third-party audio driver to expose these capabilities to users in a coordinated way so that these capabilities are available to all application programs on a computing device. An audio stack according to the invention allows a third party to separate its render function from other processing units (e.g., mixing). In addition, an audio stack according to the invention allows a third-party driver to partition hardware features into individual extension objects 118. The application program framework 102 of the invention provides more flexibility in the logical hardware feature partitions.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of switching between multiple views of a workspace frame window in a user interface of a dynamically extensible computer application, said user interface being generated on a display device by a computer associated therewith, said method comprising:

providing at least one user interface element for the workspace frame window of the user interface of the dynamically extensible computer application via at least one view extension object of the dynamically extensible computer application, said view extension object corresponding to a view selection service object;

integrating functionality provided by the at least one view extension object into the dynamically extensible computer application during execution of the dynamically extensible computer application via an application manager, wherein said application manager services requests during execution of the dynamically extensible computer application from the at least one view extension object to obtain the identity of other view extension objects that provide other specific functionality for integrating into the dynamically extensible computer application during execution of the dynamically extensible computer application;

managing the view selection service object via a view selector object of the application manager for switching between the multiple views of the workspace frame window, wherein the at least one view extension object corresponding to the view selection service object manages the state of the at least one user interface element by maintaining said state during said switching; and servicing requests during the execution of the dynamically extensible computer application from the at least one view extension object to obtain the identity to other view extension objects that provide other specific functionality and user interface elements for integrating into the dynamically extensible computer application during the execution said servicing including instantiating the identified other view extension objects and identifying the instantiated other view extension objects to the requesting at least one view extension objects.

2. The method of claim 1, wherein the view selector object, in response to user input, calls the view selection service object to activate or de-activate the view.

3. The method of claim 1, wherein said view selection service object stores a state of the view extension object.

4. The method of claim 1, wherein the user interface element is a plug-in.

5. The method of claim 1, wherein said view extension object comprises a chat object.

6. The method of claim 1, wherein one or more computer-readable media have computer-executable instructions for performing the method recited in claim 1.

7. The method of claim 1, further comprising verifying the validity of the requests and obtaining the required interfaces for the identified other view extension objects.

8. A computer system for generating a user interface for a dynamically extensible computer application, said user interface comprising a workspace frame window having multiple views, said system comprising:

a computer configured for executing computer-readable instructions;

at least one view extension object of the dynamically extensible computer application providing at least one user interface element for the workspace frame of the user interface, wherein the view extension object manages a state of the at least one user interface element and placement of the view extension object within the workspace frame window, said view wherein the extension object corresponds to a view selection service object;

an application manager for:

integrating functionality provided by the at least one view extension object into the dynamically extensible computer application during execution of the dynamically extensible computer application, said application manager including a view selector object for managing the view selection service object for switching between the multiple views of the workspace frame window, wherein the at least one view extension object corresponding to the view selection service object manages the state of the at least one user interface element by maintaining said state during said switching, and servicing requests during the execution of the dynamically extensible computer application from the at least one view extension object to obtain the identity to other view extension objects that provide other specific functionality and user interface elements for integrating into the dynamically extensible computer application during the execution, said servicing including instantiating the identified other view extension objects and identifying the instantiated other view extension objects to the requesting at least one view extension objects; and a display device associated with the computer on which the user interface is displayed.

9. The system of claim 8, wherein the view selector object, in response to user input, calls the view selection service object to activate or de-activate the view.

10. The system of claim 8, wherein said view selection service object stores a state of the view extension object.

11. The system of claim 8, wherein the user interface element is a plug-in.

12. The system of claim 8, wherein said view extension object comprises a chat object.

13. The system of claim 8 further comprising a computer-readable storage medium having stored thereon a data structure representing a header for a message, said message being encapsulated by the view extension object, said view extension object being in an extension object hierarchy of the dynamically extensible computer application, said data structure comprising:

a type field identifying a class of the view extension object; and a name field identifying the view extension object.

14. The system of claim 13, wherein the view extension object relates to the workspace frame window in the user interface of the dynamically extensible computer application, and wherein said type field corresponds to a type of said workspace frame window in said user interface of the dynamically extensible computer application.

15. The system of claim 13, wherein the view extension object relates to the workspace frame window in the user interface of the dynamically extensible computer application, and wherein said name field corresponds to an identifier of said workspace frame window in said user interface of the dynamically extensible computer application.

16. The computer system of claim 8, said servicing including verifying the validity of the requests and obtaining the required interfaces for the identified other view extension objects.

* * * * *